United States Patent [19]
Tomita et al.

[11] 3,969,542
[45] July 13, 1976

[54] CATALYSTS AND METHODS OF MAKING
[75] Inventors: Tadayoshi Tomita, Yokohama; Mikio Noda; Yoshinobu Yamaguchi, both of Nagoya; Kin-ichiro Uwano, Kariya, all of Japan
[73] Assignees: Toyo Engineering Corporation, Tokyo; Fujimi Kenmazai Kogyo Co., Ltd., both of Japan
[22] Filed: July 12, 1974
[21] Appl. No.: 487,892

[52] U.S. Cl. ............................... 252/457; 252/463; 252/475
[51] Int. Cl.² .................. B01J 29/00; B01J 23/08
[58] Field of Search .......... 252/457, 463, 475, 448; 48/214

[56] References Cited
UNITED STATES PATENTS

| | | | |
|---|---|---|---|
| 3,679,605 | 6/1972 | Sanford et al. | 252/463 |
| 3,695,856 | 10/1972 | Paul et al. | 252/457 X |
| 3,737,491 | 6/1973 | Stander et al. | 252/475 X |
| 3,767,567 | 10/1973 | Tomita et al. | 208/122 |

Primary Examiner—Carl F. Dees
Attorney, Agent, or Firm—Woodhams, Blanchard and Flynn

[57] ABSTRACT

A sintered catalyst article is prepared by:
molding into a shaped article and aging (I) either
  a. a refractory powder of calcium aluminate substantially free of silicon dioxide, alone, or
  b. a homogenous mixture of
    1. said refractory powder and
    2. at least one member selected from the group consisting of aluminum oxide, calcium oxide, beryllium oxide, magnesium oxide, strontium oxide and a compound which is converted by heating to one of said oxides;
(II) sintering said molded and aged article at a temperature above 1150°C;
the thus sintered catalyst article containing 10 to 60 wt. percent of calcium oxide, 30 to 90 wt. percent of aluminum oxide, 0 to 30 wt. percent of at least one oxide selected from the group consisting of beryllium oxide, magnesium oxide and strontium oxide, and less than 0.2 wt. percent of silicon dioxide.

10 Claims, 1 Drawing Figure

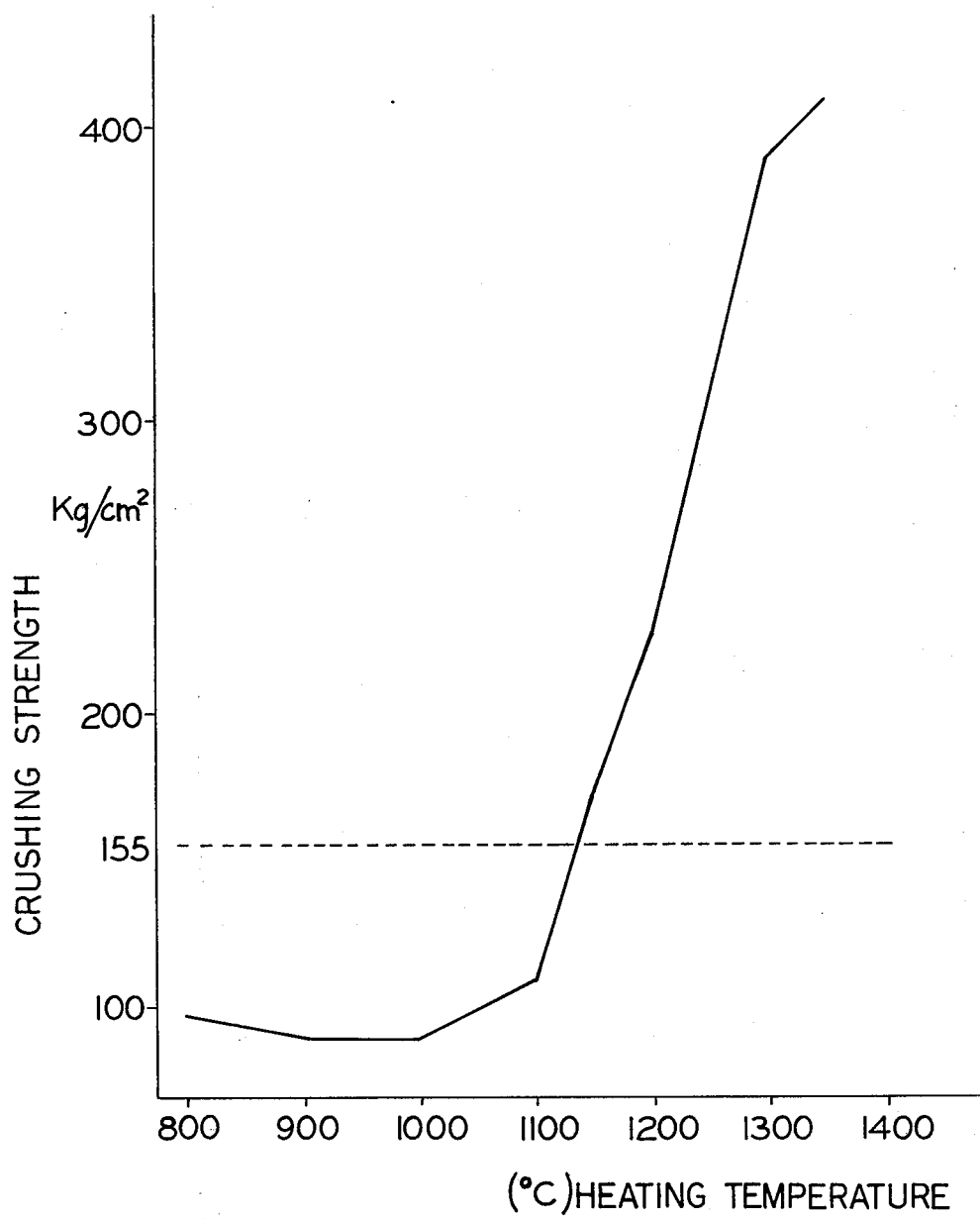

3,969,542

CATALYSTS AND METHODS OF MAKING

BACKGROUND OF THE INVENTION

FIELD OF THE INVENTION

This invention relates to an improved catalyst useful in the steam reforming, catalytic partial oxidation or catalytic cracking of hydrocarbons and to a method of preparing that catalyst.

In carrying out the steam reforming, catalytic partial oxidation or catalytic cracking of hydrocarbons, there have been used catalysts containing nickel or nickel oxide as principal active component, and aluminum oxide, silicon dioxide, etc.

The most serious problem in the use of those catalysts is that there is a likelihood that carbon will deposit on the surface of the catalysts. This demolishes the activity of the catalysts.

There have been widely used catalysts composed of the above-mentioned catalyst components and, in addition, a compound of an alkali metal such as sodium, lithium and potassium for reducing or preventing carbon deposition. Although a considerable effect can be obtained by the addition of the alkali metal compounds, this is accompanied by the need to strictly limit the hydrocarbons to be used as the feedstock in the reaction in order to avoid carbon deposition. In practice, the indispensable conditions are that only hydrocarbons lighter than naphtha can be used as feedstock and that the sulfur content of the feedstock is less than 1 ppm., preferably less than 0.2 ppm.

SUMMARY OF THE INVENTION

The invention relates to a catalyst composition, a method of preparing same and a method of using the catalysts in the field of the steam reforming of hydrocarbons, the steam cracking of hydrocarbons, and the partial oxidation of hydrocarbons. The catalyst is a sintered catalyst that is made as follows:

I. kneading either (a) a refractory powder of calcium aluminate substantially free of silicon dioxide, alone, or (b) a mixture of
  1. said refractory powder and
  2. at least one member selected from the group consisting of aluminum oxide, calcium oxide, beryllium oxide, magnesium oxide, strontium oxide and a compound which is converted by heating to one of said oxides;
II. molding the kneaded material into a shaped article;
III. aging the molded article; and
IV. sintering the aged article at a temperature above 1150°C., the thus sintered catalyst article containing 10 to 60 wt. percent of calcium oxide, 30 to 90 wt. percent of aluminum oxide, 0 to 30 wt. percent of at least one oxide selected from the group consisting of beryllium oxide, magnesium oxide and strontium oxide, and less than 0.2 wt. percent of silicon dioxide.

BRIEF DESCRIPTION OF THE DRAWING

The drawing is a graph showing the interrelationship between the heating temperature in the preparation of a catalyst according to the present invention and the crushing strength of the catalyst.

DETAILED DESCRIPTION OF THE INVENTION

There has been previously discovered a process wherein hydrocarbons are subjected to steam reforming to obtain hydrogen-rich gas, characterized in that the reaction is carried out in the presence of a catalyst containing 10 to 60 wt. percent of calcium oxide and 40 to 90 wt. percent of aluminum oxide at a reaction temperature of about 850° (as described in U.S. Ser. No. 178,264, filed Sept. 7, 1971, the entire contents of which are incorporated herein by reference, now abandoned, and replaced by continuation application Ser. No. 521,865, filed Nov. 7, 1974.) There has also previously been discovered a process wherein hydrocarbons are subjected to catalytic cracking in the presence of steam under ambient pressure to obtain a gaseous mixture containing olefins, characterized in that a reaction temperature in the range of 650°–900°C is employed and a sintered catalyst comprising (a) one or more oxides selected from the group consisting of beryllium oxide, calcium oxide and strontium oxide and (b) aluminum oxide is used (as described in U.S. Pat. No. 3,767,567, the entire contents of which are incorporated herein by reference.)

Further, there has also been discovered a process wherein hydrocarbons are subjected to catalytic partial oxidation to obtain hydrogen-rich gas, using a sintered catalyst consisting of 10 to 60 wt. percent of calcium oxide, 40–90 wt. percent of aluminum oxide, less than 1.0 wt. percent of silicon dioxide and less than 3.0 wt. percent of other inorganic contaminants of oxides of metals higher than Group V of the Periodic Table, (as disclosed in U.S. Ser. No. 244,549, filed Apr. 17, 1972, the entire contents of which are incorporated herein by reference, now abandoned, and replaced by continuation application Ser. No. 462,929, filed Apr. 22, 1974.)

It has been found that, in all of the above described hydrocarbon steam reforming, catalytic partial oxidation and catalytic cracking processes, if the catalyst containing calcium oxide and aluminum oxide as main components or the catalyst containing (a) at least one member selected from the group consisting of beryllium oxide, magnesium oxide, calcium oxide and strontium oxide and (b) aluminum oxide as main components is used, carbon deposition on the surface of the catalyst does not substantially occur when light oils are used as feedstock and even in the case of gasification of petroleum containing distillation residues. It has been found also that, for obtaining the desired effect of the catalysts, it is critical that the silicon dioxide content of the catalyst is less than 0.2 wt. percent, preferably less than 0.1 wt. percent.

Table 1 presents the results of experiments showing the relationship between carbon deposition and the amount of silicon dioxide contained in a catalyst in the steam reforming of n-heptane at a temperature of 900°C. It is apparent from Table 1 that an optimum result can be obtained if silicon dioxide is substantially not present in the catalyst. It is further necessary that the calcium oxide content of the catalyst is more than 10 wt. percent, preferably more than 20 wt. percent.

Table 1

| | |
|---|---|
| Feedstock: | n-Heptane |
| Reaction temperature: | 900°C |
| Molar ratio of steam to carbon: | 3/1 |
| Amounts of active ingredients in the catalyst: | Al$_2$O$_3$ 49.09 wt. percent |
| | CaO 50.15 wt. percent |

Table 1-continued

| Amount of silicon dioxide in catalyst (wt. percent) | Carbon Deposition Effect |
|---|---|
| 0.01, 0.05, 0.09, 0.12 | No carbon deposition |
| 0.21, 0.29, 0.42, 0.48, 0.55 | Carbon deposition occurs, but if the feed of hydrocarbon is stopped and only steam is fed for 30 minutes, the deposited carbon disappears |
| 0.82, 0.91 | Carbon deposition occurs, which cannot be removed even by feeding only steam for 30 minutes |

Thus, it is required that the sintered catalyst composition, according to the invention, contains less than 0.2 wt. percent, preferably less than 0.1 wt. percent, of silicon dioxide and that it contains from 10 to 60 wt. percent, preferably more than 20 wt. percent, of calcium oxide. However, it is quite difficult to obtain such a sintered product having sufficient refractoriness, steam resistance and mechanical strength to make it suitable for use on an industrial basis.

It is known that, by adding a silicate-containing substance such as kaolin or bentonite to a composition containing calcium oxide and aluminum oxide, the molding and sintering operations are facilitated. Further, a strong binding property can be obtained by adding alumina cement containing silicon dioxide and iron oxide thereto and sintering the same. However, in such a case, the silicon dioxide content of the sintered product is at least about 2 wt. percent, usually up to about 10 percent, and using these methods it is impossible to make the silicon dioxide content to be less than 0.2 wt. percent.

Accordingly, if a catalyst having such a high silicon dioxide content is used in the steam reforming, partial oxidation or catalytic cracking of hydrocarbons as stated above, continuous operation is impossible due to the carbon deposition that occurs on the surface thereof.

However, indispensable conditions and characteristic features of the catalyst of the present invention are (1) that the catalyst contains (A) from 10 to 60 wt. percent of calcium oxide, preferably 20 to 50 wt. percent, (B) from 30 to 90 wt. percent of aluminum oxide, preferably 40 to 90 wt. percent, as main components and (2) the catalyst is substantially free of silicon dioxide, i.e., contains less than 0.2 wt. percent thereof. The catalyst can optionally contain up to 30 wt. percent of one or more oxides selected from the group consisting of beryllium oxide, magnesium oxide and strontium oxide. The composition may contain up to about 3 wt. percent of other metal oxides, as casual contaminants.

A sintered catalyst suitable for industrial use in the above-described processes must satisfy severe requirements, including the catalyst must have sufficient strength that the catalyst is not softened or deformed and no damage such as cracking or breaking of the molded catalyst shapes occurs even if they are exposed to a high temperature of 1100°C for a long period of time and that the catalyst is not slaked with steam under a high temperature, namely, the catalyst is free from hydration-pulverization.

In order to obtain a sintered catalyst satisfying such severe requirements, we have made experiments wherein a powderly mixture of calcium oxide and aluminum oxide was kneaded together with water; various binders were tested; and the amounts of respective components, the particle size of powder, the molding pressure and the sintering temperature were varied. However, we did not succeed in obtaining a catalyst having the desired mechanical strength and other properties. We have tried further in the same manner various mixtures of calcium oxide and beryllium oxide or strontium oxide added with aluminum oxide, but the results were not enough for obtaining long life catalysts. We have now discovered that sintered products having the desired composition and physical and chemical properties can be obtained by kneading either (a) a refractory powder of calcium aluminate but substantially free from silicon dioxide, alone, or (b) a mixture of (1) the refractory powder and (2) at least one member selected from the group consisting of aluminum oxide, calcium oxide, beryllium oxide, magnesium oxide, strontium oxide and a compound which is converted by heating to one of said oxides, together with water and with or without a molding assistant, then molding and aging the same and thereafter sintering the same at a temperature of from 1150° to about 1500°C. The thus obtained sintered product contains 10 to 60 wt. percent of calcium oxide, 30 to 90 wt. percent of aluminum oxide, 0 to 30 wt. percent of at least one oxide selected from the group consisting of beryllium oxide, magnesium oxide and strontium oxide, and less than 0.2 wt. percent of silicon dioxide.

The process for the preparation of the catalyst will be illustrated below in detail.

As calcium aluminates, there are known $CaO.6Al_2O_3$, $CaO.2Al_2O_3$, $CaO.Al_2O_3$, $12CaO.7Al_2O_3$ and $3CaO.Al_2O_3$.

According to the present invention, there is used refractory alumina cement of a high purity or a product obtained by heating a high purity mixture of aluminum oxide and calcium oxide at a high temperature in the range of 1600° to 2000°C and pulverizing the same to form a powder mainly comprising calcium aluminate, having a heat resistance such that the fusing temperature thereof is above about 1600°C, and the powder is substantially free from silicon dioxide. If a molded and aged article of the said refractory powder is heated to 1150° to 1500°C, it is thereby sintered to give a strong molded product without entering a fused liquid phase.

If the aluminum oxide content of the refractory powder is above 65 wt. percent, partial fusion or deformation of the article owing to fusion is not caused, even at a high temperature of 1500°C, and a stable sintering treatment can be effected.

If at least one oxide selected from the group consisting of aluminum oxide, calcium oxide, beryllium oxide, magnesium oxide and strontium oxide is mixed in the refractory powder, a sintered product of sufficient strength can be obtained by heating the composition to a high temperature of 1150° to 1500°C, in spite of the substantial absence of silicon dioxide in the composition.

The incorporation of one or more of those oxides is effected by mixing said refractory calcium aluminate powder with at least one of those oxides or of compounds which form those oxides by heating to 1150° to 1500°C, such as the hydroxides, carbonates or nitrates thereof.

The refractory calcium aluminate powder is contained in the composition, prior to molding, generally in an amount of at least 25 wt. percent so as to provide strength for the molded catalyst article.

When the refractory powder is mixed with water to facilitate molding, it is necessary to control aggregation of the particles of the composition and to maintain good homogeneity during the kneading and molding treatments. For this purpose, a proper amount of an organic binding agent such as methyl cellulose, ammonium alginate, a wax emulsion, cellulose or an oil can be added thereto prior to molding, preferably before kneading. The oil can be a hydrocarbon oil such as kerosene. These binding agents are added thereto directly or in the form of a mixture with water or of an aqueous solution.

If it is desired to obtain a porous, sintered product, a foaming agent can be added with the organic binding agent.

The composition is kneaded homogeneously together with said additives and generally 10 to 30 wt. percent of water in a suitable mixing apparatus.

The kneaded mixture is then shaped into articles, i.e., pellets, rings, tubes, balls or plates, of a desired shape and size by conventional tablet-molding, rolling granulation, extrusion molding or the like molding processes. The homogeneous moldings having the predetermined shape and size, free from any spalling, peeling and cracking or breakage, are released from the molding device and are charged into a closed vessel and are aged therein for at least one day or longer while evaporation of water is prevented.

By the aging treatment, the binding strength is increased. For example, when the molded articles achieve a crushing strength of about 120 $Kg/cm^2$ or more, breaking is not caused by subsequent handling. After the aging step, the molded products are dried slowly, i.e., in ambient air or a low temperature oven, to remove most of the uncombined water.

The molded catalyst products are charged into a refractory vessel of a kind which does not cause adherence to the products by fusion such as an alumina casing and they are then sintered in a sintering furnace. In the sintering, the temperature is gradually elevated during the initial stage to nearly complete dehydration of the moldings and burning off of the organic matters and, thereafter, the rate of elevation of the temperature is increased until the final sintering temperature of 1150° to 1500°C is reached.

During the temperature increase to about 1000°C, thermal decomposition of the components of the mixture and elimination of bound water are completed and reaction of calcium aluminate powder or reaction of the said powder with the other oxide components are caused. At a temperature above 1150°C, firm bonding is attained within a period of at least about 1 hour, for example, 2 to 5 hours.

The influence of the heating temperature on the crushing strength of the sintered product is shown in FIG. 1. The chemical composition of the sintered product shown in FIG. 1 comprises 51.48 percent of CaO, 47.70 percent of $Al_2O_3$, 0.06 percent of $SiO_2$ and 0.73 percent of other inorganic contaminants. Cylindrical test pieces of a diameter of 12.5 mm and a height of 12.5 mm are heated and kept at various predetermined sintering temperatures in the range of 800° to 1400°C for 2 hours and then cooled. The crushing strength of these test pieces is determined. The crushing strength of the dry test pieces before the sintering treatment was 155 $Kg/cm^2$. From the results shown in FIG. 1, it is evident that at a sintering temperature of above 1150°C, the strength of the sintered product is considerably increased.

The catalyst, i.e. the sintered product article, of the present invention has a ratio of volume of open pores to the entire volume of the article, i.e. apparent porosity, of 30 to 60 percent; a specific gravity per unit volume of the sintered product, i.e. bulk density, of 1.2 to 2.0; a pore radius determined with a mercury-hydraulic porosity meter of 0.5 to $5\mu$; a compression breaking load per unit area, i.e. crushing strength, of 120 to 500 $Kg/cm^2$. Depending upon the use, a catalyst having the desired chemical composition and properties can be selected properly by selection of the amounts of oxides used and the process conditions, within the parameters described above.

Further, breaking of the catalyst by water after immersing the catalyst in boiling water for one hour, change in weight of the samples by hydration before and after the boiling and volume stability were examined.

The crushing strength of the sintered product at ambient temperature was determined with an Amsler compression tester.

The preparation and the use of the sintered products as catalyst will be further described by reference to the following illustrative examples.

EXAMPLE 1

18 Parts of commercial calcined alumina powder were mixed with 82 parts of a high quality calcium alumina cement comprising 79.0 percent of $Al_2O_3$, 18.0 percent of CaO, 0.4 percent of MgO, 0.5 percent of $Na_2O$, 0.3 percent of $Fe_2O_3$ and 0.1 percent of $SiO_2$ and having an ignition loss of 1.5 percent, a fineness of 97 wt. percent of the particles being less than 200 mesh and a refractoriness of 1763°C. Further, 1 part of methyl cellulose was added thereto and the mixture was then kneaded together with 30 parts of water. Cylindrical pellets of a diameter of 12.5 mm and a length of about 13 mm were prepared with an extrusion molding machine.

The moldings were aged, dried, treated in a heavy oil tunnel kiln at a temperature which was raised up to 1300°C and held at that temperature for 2 hours and cooled.

The chemical composition of the resulting sintered product was 84.01 percent of $Al_2O_3$, 14.91 percent of CaO, 0.33 percent of MgO, 0.14 percent of $Na_2O$, 0.25 percent of $Fe_2O_3$ and 0.08 percent of $SiO_2$. The product had an apparent porosity of 35.9 percent, an apparent specific gravity of 3.07 and a bulk density of 1.97. The product was not broken by immersion in boiling water. The rate of increase in weight by immersion in boiling water was 14.7 percent. The crushing strength at ambient temperature was 319 $Kg/cm^2$.

Steam reforming of hydrocarbons was effected by using the thus prepared articles as catalyst. The results are shown below.

| | |
|---|---|
| Feedstock | Light oil |
| End boiling point (°C) | 360 |
| Specific gravity | 0.784 |
| Elementary analysis (wt. percent) | |
| C | 85.67 |
| H | 13.40 |
| S | 0.79 |
| Reaction conditions | |
| Temperature (°C) | 1,000 |
| Pressure ($Kg/cm^2G$) | 0 |

-continued

| | |
|---|---|
| H$_2$O/C (molar ratio) | 4 |
| Space velocity (Hr$^{-1}$) | 2,300 |
| (Hourly reactor effluent volume/Bulk catalyst volume) | |
| Gasification rate (percent) | 99.7 |
| Composition of reaction product (Vol. percent) | |
| H$_2$ | 59.5 |
| CO | 10.5 |
| CO$_2$ | 16.6 |
| CH$_4$ | 13.4 |
| Continuous reaction time (hr.) | 20 |
| Carbon deposition | nil |

EXAMPLE 2

54.5 Parts of precipitated calcium carbonate powder were mixed with 45.5 parts of a high quality electrofused alumina cement powder comprising 79.27 percent of Al$_2$O$_3$, 18.57 percent of CaO, 0.21 percent of Fe$_2$O$_3$ and 0.12 percent of SiO$_2$ and having an ignition loss of 1.50 percent, a fineness of 97 percent by weight of particles of less than 88 microns and a refractoriness of 1800°C.

Further, 3 parts of purified kerosene and 1 part of ethyl cellulose were added thereto and the mixture was then kneaded thoroughly together with 27 parts of water. Molding, aging and sintering were effected in the same manner as in Example 1.

The chemical composition of the resulting sintered product was 49.04 percent of Al$_2$O$_3$, 50.13 percent of CaO, 0.25 percent of MgO, 0.30 percent of Na$_2$O, 0.18 percent of Fe$_2$O$_3$ and 0.06 percent of SiO$_2$. The product had an apparent porosity of 48.2 percent, an apparent specific gravity of 2.76 and a bulk density of 1.42. The product was not broken when immersed in boiling water. The rate of increase in weight by immersion in the boiling water was 25.1 percent. The crushing strength at ambient temperature was 388 kg/cm$^2$.

a. Steam reforming of hydrocarbons was effected by using the thus prepared catalyst. The results are shown below.

| Feedstock | Kuwait crude oil |
|---|---|
| Specific gravity | 0.853 |
| Elementary analysis (wt. percent) | |
| C | 84.42 |
| H | 12.00 |
| S | 2.43 |
| Reaction conditions | |
| Temperature (°C) | 1,000 |
| Pressure (Kg/cm$^2$G) | 30 |
| H$_2$O/C (molar ratio) | 4 |
| Space velocity (Hr$^{-1}$) | 2,000 |
| Gasification rate (percent) | 99.6 |
| Composition of reaction product (vol. percent) | |
| H$_2$ | 58.1 |
| CO | 11.3 |
| CO$_2$ | 13.4 |
| CH$_4$ | 17.2 |
| Continuous reaction time (hr.) | 90 |
| Carbon deposition | nil | b. Partial oxidation of hydrocarbons was effected by using the same catalyst. The results are shown below.

| Feedstock | Atmospheric distillation residue of Kuwait crude oil |
|---|---|
| Specific gravity | 0.923 |
| Elementary analysis (wt. percent) | |
| C | 86.09 |
| H | 11.56 |
| S | 1.97 |
| Oxidizing agent | Oxygen (95 percent purity) |
| Reaction conditions | |
| Temperature (°C) | 1,000 |
| Pressure (Kg/cm$^2$G) | 20 |
| H$_2$O/C (molar ratio) | 0.8 |
| O$_2$/C (molar ratio) | 0.46 |
| Space velocity (Hr$^{-1}$) | 1,100 |
| Gasification rate (percent) | 99.6 |
| Composition of reaction product (vol. percent) | |
| H$_2$ | 52.42 |
| CO | 36.28 |
| CO$_2$ | 10.25 |
| CH$_4$ | 1.05 |
| Continuous reaction time (hr.) | 96 |
| Carbon deposition | nil | c. Thermal cracking of hydrocarbons was effected by using the same catalyst. The results are shown below.

| Feedstock | Light oil |
|---|---|
| End boiling point (°C) | 360 |
| Specific gravity | 0.823 |
| Elementary analysis (wt. percent) | |
| C | 85.67 |
| H | 13.40 |
| S | 0.79 |
| Reaction conditions | |
| Temperature (°C) | 825 |
| Pressure (Kg/cm$^2$G) | 1 |
| H$_2$O/C (molar ratio) | 0.5 |
| Contact time (sec.) | 0.24 |
| Yield of reaction product (wt. percent) | |
| H$_2$ | 1.26 |
| CO | 0.60 |
| CO$_2$ | 2.68 |
| CH$_4$ | 12.50 |
| C$_2$H$_6$ | 2.16 |
| C$_2$H$_4$ | 25.34 |
| C$_3$H$_8$ | 1.00 |
| C$_3$H$_6$ | 13.32 |
| C$_4$H$_{10}$ | 0.81 |
| C$_4$H$_8$ | 1.00 |
| C$_4$H$_6$ | 5.85 |
| Fraction above C$_5$ | 33.06 |
| Continuous reaction time (hr.) | 73 |
| Carbon deposition | nil |

EXAMPLE 3

62.4 Parts of precipitated calcium carbonate powder and 6.4 parts of powdered magnesium hydroxide comprising 66.0 percent of MgO, 0.5 percent of CaO, 0.2 percent of Al$_2$O$_3$, 0.04 percent of Fe$_2$O$_3$ and 0.03 percent of SiO$_2$ and having an ignition loss of 33.0 percent were mixed with 31.2 parts of the high quality calcium alumina cement as used in Example 1. Further, 1 part of methyl cellulose was added thereto and the mixture was then kneaded thoroughly together with 35 parts of water. Molding, aging and sintering were effected in the same manner as in Example 1.

The chemical composition of the resulting, sintered product was 35.22 percent of Al$_2$O$_3$, 57.96 percent of CaO, 6.40 percent of MgO, 0.22 percent of Na$_2$O, 0.13 percent of Fe$_2$O$_3$ and 0.04 percent of SiO$_2$. The product had an apparent porosity of 54.4 percent, an apparent specific gravity of 2.96 and a bulk density of 1.34. The product was not broken when immersed in boiling water. The rate of increase in weight by the immersion in boiling water was 17.8 percent. The crushing strength at ambient temperature was 126 Kg/cm$^2$.

The partial oxidation of hydrocarbons was effected by using the thus obtained catalyst. The results were as shown below.

| Feedstock | Kuwait crude oil |
|---|---|
| Specific Gravity | 0.853 |
| Elementary analysis (wt. percent) | |
| C | 84.42 |
| H | 12.0 |
| S | 2.43 |
| Oxidizing agent | Oxygen (95 percent purity) |
| Reaction conditions | |
| Temperature (°C) | 1,000 |
| Pressure (Kg/cm$^2$G) | 20 |
| H$_2$O/C (molar ratio) | 0.39 |
| O$_2$/C (molar ratio) | 0.43 |
| Space velocity (Hr$^{-1}$) | 1,100 |
| Gasification rate | 99.8 |
| Composition of reaction (product vol. percent) | |
| H$_2$ | 50.37 |
| CO | 42.59 |
| CO$_2$ | 5.04 |
| CH$_4$ | 0.23 |
| Continuous reaction time (hr.) | 115 |
| Carbon deposition | nil |

EXAMPLE 4

33.3 Parts of commercial, first quality powdered strontium carbonate were mixed with 66.7 parts of a high quality calcium alumina cement as used in Example 1. Further, 1 part of methyl cellulose was added thereto and the mixture was then kneaded thoroughly together with 30 parts of water. Molding, aging and sintering were effected in the same manner as in Example 1.

The chemical composition of the resulting, sintered product was 58.8 percent of Al$_2$O$_3$, 14.21 percent of CaO, 0.27 percent of MgO, 25.75 percent of SrO, 0.30 percent of Na$_2$O, 0.22 percent of Fe$_2$O$_3$ and 0.07 percent of SiO$_2$. The product had an apparent porosity of 53.4 percent, an apparent specific gravity of 3.19 and a bulk density of 1.48. The product was not broken by immersion in boiling water. The rate of increase in weight by the immersion in boiling water was 23.4 percent. The pore volume was 0.338 cm$^3$/g, the pore radius (50 percent distribution) was 0.6 micron and the curshing strength at ambient temperature was 266 Kg/cm$^2$.

The partial oxidation of hydrocarbons was effected by using the thus obtained catalyst. The results were as shown below.

| Feedstock | Kuwait crude oil |
|---|---|
| Specific gravity | 0.853 |
| Elementary analysis (wt. percent) | |
| C | 84.42 |
| H | 12.00 |
| S | 2.43 |
| Oxidizing agent | Air |
| Reaction conditions | |
| Temperature (°C) | 1,000 |
| Pressure (Kg/cm$^2$G) | 0 |
| H$_2$O/C (molar ratio) | 1.45 |
| O$_2$/C (molar ratio) | 0.44 |
| Space velocity (Hr$^{-1}$) | 2450 |
| Composition of reaction product (vol. percent) | |
| H$_2$ | 17.78 |
| CO | 11.48 |
| CO$_2$ | 8.37 |
| CH$_4$ | 1.16 |
| N$_2$ | 60.75 |
| Continuous reaction time (hr.) | 24 |
| Carbon deposition | nil |

EXAMPLE 5

2.5 Parts of powdered beryllium oxide of purity 99.5 percent were mixed with 2.5 parts of purified kerosene. 97.5 Parts of the high quality calcium alumina cement used in Example 1 were then mixed therewith. The mixture was kneaded thoroughly together with 25 parts of water. Molding, aging and sintering were effected in the same manner as in Example 1.

The chemical composition of the resulting, sintered product was 78.03 percent of Al$_2$O$_3$, 17.83 percent of CaO, 0.39 percent of MgO, 2.77 percent of BeO, 0.50 percent of Na$_2$O, 0.29 percent of Fe$_2$O$_3$ and 0.10 percent of SiO$_2$. The product had an apparent porosity of 35.3 percent, an apparent specific gravity of 2.85 and a bulk density of 1.91. The product was broken by immersion in boiling water. The rate of increase in weight by immersion in the boiling water was 26.2 percent. The crushing strength at ambient temperature was 315 Kg/cm$^2$.

Thermal cracking of hydrocarbons was effected by using the thus obtained catalyst in the presence of steam to obtain an olefin-containing gas product. The results were as shown below.

| Feedstock | Naphtha |
|---|---|
| End boiling point (°C) | 180 |
| Specific gravity | 0.674 |
| Elementary analysis (wt. percent) | |
| C | 84.37 |
| H | 14.87 |
| S | 0.17 |
| Reaction conditions | |
| Temperature (°C) | 820 |
| Pressure (Kg/cm$^2$G) | 0 |
| H$_2$O/C (molar ratio) | 1.02 |
| Contact time (sec.) | 0.1 |
| Yield of reaction product (wt. percent) | |
| H$_2$ | 2.3 |
| CO | 1.9 |
| CO$_2$ | 13.5 |
| CH$_4$ | 19.1 |
| C$_2$H$_6$ | 1.8 |
| C$_2$H$_4$ | 39.8 |
| C$_3$H$_8$ | 0.7 |
| C$_3$H$_6$ | 13.1 |
| C$_4$H$_{10}$ | 0.1 |
| C$_4$H$_8$ | 1.9 |
| C$_4$H$_6$ | 4.4 |
| Fraction above C$_5$ | 13.7 |
| Continuous reaction time (hr.) | 120 |
| Carbon deposition | nil |

EXAMPLE 6

1 Part of methyl cellulose was added to 100 parts of the high quality calcium alumina cement as used in Example 1. The mixture was kneaded throughly together with 30 parts of water. Molding, aging and sintering were effected in the same manner as in Example 1.

The chemical composition of the resulting, sintered product was 80.3 percent of Al$_2$O$_3$, 18.3 percent of CaO, 0.40 percent of MgO, 0.50 percent of Na$_2$O+K$_2$O, 0.30 percent of Fe$_2$O$_3$ and 0.10 percent of SiO$_2$. The product has an apparent porosity of 36.1 percent, an apparent specific gravity of 2.95 and a bulk density of 1.89. The product was not broken in immersion in boiling water. The rate of increase in weight by immersion in the boiling water was 17.0 percent. The crushing strength at ambient temperature was 226 Kg/cm$^2$.

The thermal cracking of hydrocarbons was effected in the presence of steam by using the thus obtained catalyst. The results were as shown below.

| Feedstock | Light oil |
|---|---|
| End boiling point (°C) | 360 |
| Specific gravity | 0.827 |
| Elementary analysis (wt. percent) | |
| C | 85.67 |
| H | 13.40 |
| S | 0.79 |
| Reaction conditions | |
| Temperature (°C) | 750 |
| Pressure (kg/cm$^2$G) | 0 |
| H$_2$O/C (molar ratio) | 0.55 |
| Contact time (sec.) | 0.35 |
| Yield of reaction product (wt. percent) | |
| H$_2$ | 1.7 |
| CO | 0.3 |
| CO$_2$ | 10.9 |
| CH$_4$ | 10.1 |
| C$_2$H$_6$ | 2.9 |
| C$_2$H$_4$ | 23.7 |
| C$_3$H$_8$ | 0.5 |
| C$_3$H$_6$ | 16.9 |
| C$_4$H$_{10}$ | 0 |
| C$_4$H$_8$ | 5.7 |
| C$_4$H$_6$ | 5.0 |
| Fraction above C$_5$ | 31.5 |
| Continuous reaction time (hr.) | 95 |
| Carbon deposition | nil |

EXAMPLE 7

28.4 Parts of commercial, first grade powdered strontium carbonate, 14.0 parts of commercial, powdered, calcined alumina and 20 parts of powdered magnesium hydroxide were incorporated in 55.6 parts of the high quality calcium alumina cement as used in Example 1. Further, 10 parts of a wax emulsion containing 40 percent of microwax particles of 1–3 microns were added thereto. The mixture was kneaded throughly together with 15 parts of water. Molding, aging and sintering were effected in the same manner as in Example 1.

The chemical composition of the resulting, sintered product was 65.48 percent of Al$_2$O$_3$, 11.06 percent of CaO, 1.79 percent of MgO, 20.25 percent of SrO, 0.37 percent of Na$_2$O, 0.18 percent of Fe$_2$O$_3$ and 0.07 percent of SiO$_2$. The product had an apparent porosity of 53.0, an apparent specific gravity of 3.5 and a bulk density of 1.48. The product was not broken by immersion in boiling water. The rate of increase in weight by immersion in the boiling water was 20.8 percent. The crushing strength at ambient temperature was 246 Kg/cm$^2$.

The thermal cracking of hydrocarbons was effected in the presence of steam by using the thus obtained catalyst. The results were as shown below.

| Feedstock | Fraction of reduced pressure distillation |
|---|---|
| Specific gravity | 0.898 |
| Elementary analysis (wt. percent) | |
| C | 80.49 |
| H | 12.74 |
| S | 0.77 |
| Reaction conditions | |
| Temperature (°C) | 900 |
| Pressure (Kg/cm$^2$G) | 3.0 |
| H$_2$O/C (molar ratio) | 1.15 |
| Contact time (sec.) | 0.035 |
| Yield of reaction product (wt. percent) | |
| H$_2$ | 1.7 |
| CO | 1.5 |
| CO$_2$ | 3.6 |
| CH$_4$ | 15.2 |
| C$_2$H$_6$ | 1.1 |
| C$_2$H$_4$ | 30.3 |
| C$_3$H$_8$ | 1.8 |
| C$_3$H$_6$ | 4.0 |
| C$_4$H$_{10}$ | 0 |
| C$_4$H$_8$ | 0.3 |
| C$_4$H$_6$ | 1.9 |
| Fraction above C$_5$ | 42.5 |
| Continuous reaction time (hr.) | 5 |
| Carbon deposition | nil |

The embodiments of the invention in which an exclusive property or privelege is claimed are defined as follows:

1. The method of preparing a sintered catalyst article which comprises the steps of
   (I) kneading with water either (a) a refractory powder of calcium aluminate alone, or (b) a mixture of
      1. at least 25 wt. percent of said refractory powder and
      2. the balance is at least one member selected from the group consisting of aluminum oxide, calcium oxide, beryllium oxide, magnesium oxide, strontium oxide and a compound which is converted by heating to one of said oxides,
   wherein (a) and (b) contain less than 0.2 wt. percent of silicon dioxide, less than 3.0 wt. percent of other metal oxides and the other ingredients are present in amounts effective to provide a sintered catalyst article having the composition set forth hereinbelow:
   II. molding the kneaded material into a shaped article;
   III. placing the shaped article in a vessel, closing the vessel and aging said shaped article in said closed vessel for at least one day while preventing evaporation of water to obtain a shaped article having a crushing strength of at least about 120 Kg/cm$^2$;
   IV. drying the shaped article at a low temperature to remove uncombined water; and then
   V. sintering the shaped article at a temperature above 1150°C; the thus sintered catalyst article consisting of 10 to 60 wt. percent of calcium oxide, 30 to 90 wt. percent aluminum oxide 0 to 30 wt. percent of at least one oxide selected from the group consisting of beryllium oxide, magnesium oxide and strontium oxide, less than 0.2 wt. percent of silicon dioxide and less than 3.0 wt. percent of other metal oxides.

2. The method according to claim 1 wherein the sintering step (V) is carried out at a temperature in the range of 1150° to 1500°C.

3. The method according to claim 1 wherein the aluminum oxide content of the refractory powder is above 65 wt. percent.

4. The method according to claim 1 wherein said refractory powder is a refractory alumina cement consisting essentially of calcium aluminate.

5. The method according to claim 1 wherein said refractory powder is prepared by heating a mixture of calcium oxide and aluminum oxide at a temperature in the range of 1600° to 2000°C.

6. The method according to claim 1 wherein an organic binding agent is added to said refractory powder or said mixture prior to kneading.

7. The method according to claim 6 wherein a foaming agent is added with the said organic binding agent.

8. The sintered catalyst prepared by the method of claim 1.

9. The sintered catalyst according to claim 8 wherein the aluminum oxide content of said refractory powder is above 65 wt. percent.

10. The sintered catalyst according to claim 8, wherein the shaped and sintered article has an apparent porosity of 30 to 60 percent, a bulk density of 1.2 to 2.0, a pore radius measured by a mercury-hydraulic porosity meter of from 0.5 to 5$\mu$ and a crushing strength of 120 to 500 Kg/cm$^2$.

* * * * *

UNITED STATES PATENT OFFICE
CERTIFICATE OF CORRECTION

Patent No. 3,969,542             Dated July 13, 1976

Inventor(s) Tadayoshi Tomita et al

It is certified that error appears in the above-identified patent and that said Letters Patent are hereby corrected as shown below:

On the title page, at [75]; change "Kin-ichiro Uwano" to ---Ken-ichiro Uwano---.

Signed and Sealed this

Eighth Day of February 1977

[SEAL]

Attest:

RUTH C. MASON
*Attesting Officer*

C. MARSHALL DANN
*Commissioner of Patents and Trademarks*